US012730030B2

(12) United States Patent
Nasraoui et al.

(10) Patent No.: US 12,730,030 B2
(45) Date of Patent: Sep. 8, 2026

(54) HIGH RESOLUTION IMAGING OF PRESSURIZED WATER SUPPLY LINES USING HIGH FREQUENCY ACOUSTIC WAVES

(71) Applicant: The Hong Kong University of Science and Technology, Hong Kong (CN)

(72) Inventors: Saber Nasraoui, Hong Kong (CN); Moez Louati, Hong Kong (CN); Mohamed Salah Ghidaoui, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 296 days.

(21) Appl. No.: 18/422,087

(22) Filed: Jan. 25, 2024

(65) Prior Publication Data

US 2024/0272032 A1 Aug. 15, 2024

Related U.S. Application Data

(60) Provisional application No. 63/484,167, filed on Feb. 9, 2023.

(51) Int. Cl.
*G01M 3/24* (2006.01)
*G01N 29/06* (2006.01)
(Continued)

(52) U.S. Cl.
CPC ........ *G01M 3/243* (2013.01); *G01N 29/0672* (2013.01); *G01N 29/14* (2013.01);
(Continued)

(58) Field of Classification Search
CPC ... G01M 3/243; G01N 29/0672; G01N 29/14; G01N 29/2437; G01N 29/42;
(Continued)

(56) References Cited

U.S. PATENT DOCUMENTS

2015/0008481 A1 1/2015 Pathirana et al.
2019/0036905 A1 1/2019 Roy et al.
(Continued)

FOREIGN PATENT DOCUMENTS

FR 2670583 A1 6/1992

OTHER PUBLICATIONS

O'Donoughue, N., et.al., Maximum likelihood defect localization in a pipe using guided acoustic waves. Asilomar 2012 IEEE, p. 1863-1867.

*Primary Examiner* — Xin Y Zhong
(74) *Attorney, Agent, or Firm* — S&F/WEHRW

(57) ABSTRACT

A transient-based time reversal (TR) technique for acoustic imaging of a pressurized water supply pipeline is provided. Measured multi-input-multi-output (MIMO) imaging data at high frequency (10kH-100 kHz) are processed by an adapted Time Reversal-MUltiple SIgnal Classification (TR-MUSIC) algorithm to provide a high-resolution image of a pipeline section about 100 m long. The resultant image reveals the pipe wall inner and outer condition, and incipient and existing defects at a scale up to millimeters. The technique is tested and validated in a laboratory environment and in a large-scale facility on pressurized water-filled viscoelastic high-density polyethylene pipes. Furthermore, the technique can be applied to different fluids and pipe materials. In addition, the technique is computationally efficient, and nondestructive. The technique requires only local intrusion for placing transducers at an access point.

6 Claims, 5 Drawing Sheets

(51) Int. Cl.
*G01N 29/14* (2006.01)
*G01N 29/24* (2006.01)
*G01N 29/42* (2006.01)

(52) U.S. Cl.
CPC ......... *G01N 29/2437* (2013.01); *G01N 29/42* (2013.01); *G01N 2291/0289* (2013.01); *G01N 2291/106* (2013.01); *G01N 2291/2636* (2013.01)

(58) Field of Classification Search
CPC ..... G01N 2291/0289; G01N 2291/106; G01N 2291/2636; G01N 29/46
See application file for complete search history.

(56) References Cited

U.S. PATENT DOCUMENTS

2020/0035557 A1 1/2020 Wan et al.
2022/0341879 A1* 10/2022 Kraljic ............... G01N 29/0654
2023/0000369 A1 1/2023 Druet et al.
2023/0049260 A1* 2/2023 Bouaoua .............. G01N 29/046
2023/0184720 A1* 6/2023 Gabriel Rosauro Clarke ............. G01N 29/0645 73/602

* cited by examiner

220

HIGH RESOLUTION IMAGING OF PRESSURIZED WATER SUPPLY LINES USING HIGH FREQUENCY ACOUSTIC WAVES

CROSS-REFERENCE TO RELATED APPLICATIONS

This application claims the benefit of US Provisional Patent Application No. 63/484,167, filed on Feb. 9, 2023, the disclosure of which is hereby incorporated by reference in its entirety.

LIST OF ABBREVIATIONS 2D two-dimensional
3D three-dimensional
CCTV closed circuit television
FFT fast Fourier transform
HDPE high-density polyethylene
HF high frequency
LF low frequency
MHW moving Hanning window
MIMO multi-input, multi-output
MUSIC Reversal-MUltiple SIgnal Classification
PIG pipeline inspection gauge
SVD singular value decomposition
TR time-reversal
UWSS urban water supplies system

TECHNICAL FIELD

The present disclosure generally relates to detection of one or more defects, such as pipe wall thinning and blockage, on a surface of an interior region of a pipeline. Particularly, the present disclosure relates to detection of the one or more defects by using a plurality of transducers to acoustically image the interior region.

BACKGROUND

An UWSS—a complex network of pipes that lie beneath our streets—is vital for life and economic productivity. Such system often experiences formation of defects during its lifetime due to physical and/or chemical processes, including corrosion, failure of pipe lining, and deposition of suspended fine particles. Such defects often begin as a cluster of small defects on the inside of a pipe wall which we refer to hereafter as incipient defects. The growth of such incipient defects with time can eventually lead to bursts, leaks, and sizeable blockages, resulting in unacceptably large system water losses and excessive energy use. Recent studies estimate that 126 billion cubic meters are unaccounted for annually by water utilities around the world, for an equivalent monetary loss of USD 39 billion [1]. Until now, efforts to curb these massive water losses and energy wastage in existing UWSS has focused on non-intrusive and non-destructive technology development for detecting existing, fully-fledged, physical defects and operational inefficiencies. However, pinpointing incipient defects at an early stage for remediation prevents them from further developing to an extent where they can cause severe operational problems and notable damages in pipes.

Internal sensor-based imaging systems are used to monitor and report the condition of a pipeline's internal surface and pipe wall and enable detection of corrosion sites, cracks, wall thickness, and weld condition, as well as existing leaks.

Smart PIGs were originally developed by the energy pipeline industry and have only recently been emulated by water pipe tools like Smart Ball, Sahara, CCTV, and acoustic sonar [2]-[4]. These tools may also have on-board optical, magnetic, or acoustic sensors which, like Smart PIGs, must be launched into a water pipe and be retrieved through a suitably sized port, sometimes using a tether cable. PIG-based sensors are not autonomous or semi-autonomous (even in the energy pipeline sector); rather, they are propelled by the pipe flow or tethered. This technology is suitable for use in conduits that present no obstructions to free passage of in-line sensing tools (e.g., oil and gas pipelines). On the other hand, UWSS are often intricate networks of pipes with numerous pipe-diameter changes, partial-bore inline valves and abrupt changes in direction that do not permit the use of inline Smart PIGs. In addition, inline Smart PIGs are currently a slow, in-pipe, survey process (device travels at ~0.3 m/s) that cannot support real-time imaging. Moreover, inline Smart PIGs involve significant costs and labor, require traffic diversion and cannot solve defects with separation of the order of ~80 cm and below [2].

Less costly, non-disruptive, and more efficient techniques such as transient (acoustic)-based defect detection methods have been intensively studied and developed [5]-[13]. Among these methods, the LF (<100 Hz) wave-based methods are unique for their fast speed (~1000 times faster than roving sensors) and broad coverage (~kilometers), are both economical and applicable to all fully-developed faults. However, LF wave-based methods have poor location resolution (tens to hundreds of meters [6]) and are limited to defects which are large enough to produce visible reflections since noise is strong at the LF band. Since the achievable resolution is directly proportional to the probing wavelength, HF wave-based methods have been developed to achieve a resolution in the order of centimeters [14]. Yet, these HF wave-based methods remain applicable only for fully fledged defects (i.e. through-wall defects such as leaks and also defects with a radial length scale of the order of 15% of the pipe diameter or larger).

There is a need in the art for a HF acoustic-based defect detection method for dectecting incipient defects.

SUMMARY

Mathematical equations referenced in this Summary can be found in Detailed description.

Provided herein is a method for detecting one or more defects on a surface of an interior region of a pipeline.

The method comprises: installing a plurality of transducers in the interior region, each of the transducers being capable of converting an electrical signal into an acoustic signal and vice versa; acoustically imaging the surface of the interior region to thereby generate an imaging function of the interior region, the imaging function being an estimated geometrical model of the interior region; and comparing the imaging function with an original geometrical model of the interior region to thereby identify the one or more defects on the surface of the interior region. In particular, the acoustic imaging of the surface of the interior region comprises: sensing, by each transducer in the plurality of transducers, a transient response of the interior region due to an excitation caused by an acoustic source signal generated by a transducer selected from the plurality of transducers; repeating the sensing of the transient response until all transducers in the plurality of transducers are selected to excite the interior region, whereby respective transient responses generated by the plurality of transducers form MIMO imaging data resulted from sensing the interior region; and computing the imaging function according to the MIMO imaging data.

Preferably, the acoustic source signal has a carrier frequency in a range of 10 kHz to 100 kHz for achieving a resolution of imaging the interior region in an order of millimeters.

In certain embodiments, the sensing of the transient response by an individual transducer in the plurality of transducers includes: obtaining raw measurement data acquired from the individual transducer in sensing the transient response; and subtracting a baseline system response from the raw measurement data to yield the sensed transient response of the interior region, wherein the baseline system response is a response of an intact pipeline without defect.

In certain embodiments, respective acoustic source signals generated by the plurality of transducers are same.

The MIMO imaging data may be expressed as a 3D transfer matrix of the interior region, where the 3D transfer matrix is given by EQN. (9). In certain embodiments, the computing of the imaging function according to the MIMO imaging data comprises the steps of: (a) applying a MHW in time to the 3D transfer matrix to yield a plurality of 3D local matrices; (b) applying a Fourier transform to an individual 3D local matrix to yield a frequency-transformed 3D local matrix; (c) evaluating the frequency-transformed 3D local matrix at a selected frequency determined according to the acoustic source signal to yield a frequency-domain 2D local matrix; (d) applying a SVD to the frequency-domain 2D local matrix to yield a plurality of left singular vectors, a plurality of right singular vectors, and a plurality of singular values; (c) selecting, from the plurality of left singular vectors, a selected plurality of left singular vectors belonging to a noise subspace identified from the plurality of singular values; (f) forming a local imaging function associated with the frequency-domain 2D local matrix according to a green function vector and the selected plurality of left singular vectors, wherein the green function vector is a theoretical singular vector from a signal subspace associated with an arbitrary scatterer, the theoretical singular vector being derived according to at least the original geometrical model of the interior region; (g) repeating the steps (d)-(f) for respective frequency-domain 2D local matrices generated for the plurality of 3D local matrices, whereby respective local imaging functions are obtained; and (h) computing the imaging function as a sum of the respective local imaging functions.

Preferably, the Fourier transform is a fast Fourier transform.

In certain embodiments, the acoustic source signal is selected to be a Gaussian modulated sine pulse, and the selected frequency is a carrier frequency of the Gaussian modulated sine pulse.

In certain embodiments, each transducer in the plurality of transducers installed in the interior region is a piezoelectric transducer.

Other aspects of the present disclosure are disclosed as illustrated by the embodiments hereinafter.

DETAILED DESCRIPTION

Imaging pressurized pipelines by the proposed imaging technique would permit UWSS management to move from reactive to proactive mode, where anomalies with length scales on the order of millimeter are detected and imaged (not just localized) using high frequency acoustic waves (in the range of 10 to 100 kHz). The proposed imaging technique serves as a decision support tool for timely maintenance and mitigation measures. The produced image can reveal the pipe wall inner and outer condition, incipient as well as existing defects at a scale up to millimeters and small (5% to 10%) change in wall stiffness or mass. The disclosed pipeline imaging technology is based on the wave time reversal property that has been experimentally proven in UWSS [15]. It follows that the proposed imaging technique is a transient-based TR technique. The proposed imaging technique serves as a decision support tool for timely maintenance and mitigation measures. The produced image can reveal the pipe wall inner and outer condition, and incipient as well as existing defects at a scale up to millimeters. The disclosed pipeline imaging technology is based on the wave time reversal property that has been experimentally proven in in UWSS [15]. The proposed technique involves a forward step where actively-generated high frequency waves in UWSS are sensed, followed by a Time Reversal step where the chronological order of the subspace noise is reversed and re-emitted into a model of the UWSS. The proposed technique is tested and validated in lab as well as in filed scale facility comprised of pressurized water-filled viscoelastic HDPE pipes.

In an exemplary realization of the proposed technique for acoustic imaging of pressurized water supply pipelines, measured MIMO data at HF (10 kH-100 kHz) are processed by an adapted TR-MUSIC algorithm to provide a high-resolution image of a pipeline section about 100 m long. The resultant image can reveal the pipe wall inner and outer condition, and incipient as well as existing defects at a scale up to millimeters. The proposed technique is tested and validated in lab as well as in filed scale facility on pressurized water-filled viscoelastic HDPE pipes. However, the technique can be applied to different fluids and pipe materials. In addition, the proposed technique is computationally efficient, nondestructive, and requires only local intrusion for placing sensors at an access point.

A. Methodology

Figure 1:
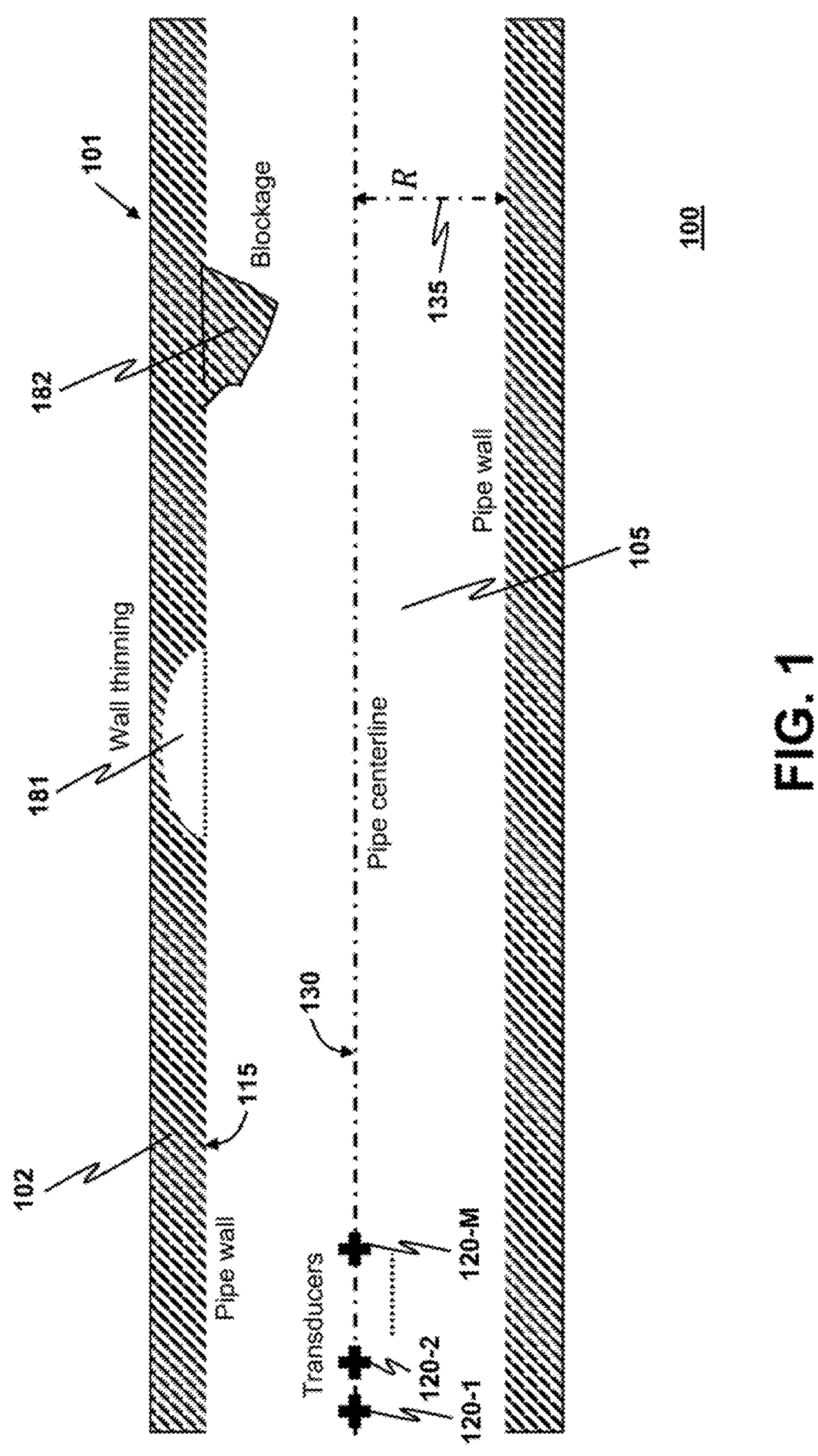
FIG. 1 provides a sketch of a water-filled pipe system having a pipeline that contains multiple defects and a piezoelectric array, where the piezoelectric array forms a plurality of transducers used not only as transmitters but also as receivers.

Consider a water-filled pipe with a cross section of radius R as sketched in FIG. 1. We use the cylindrical coordinates, (x, r), where r is defined along the radius 135 in the pipe cross section and the cylindrical coordinate x is defined along the cylinder axis 130. An M-piezoelectric sensor array is located along the pipe centerline axis 130. The piezoelectric elements are used not only as transmitters but also as receivers. Each element in the piezoelectric array is excited in turn, and all the array elements receive response signals.

The proposed pipeline imaging technique involves an experimental stage and a theoretical stage.

A.1. Experimental Stage: Collecting the Transfer Matrix Data

Measurement. The MIMO data are obtained via an array of M piezoelectric transducers 120-1:M, which can both project and sense acoustic waves. FIG. 1 shows the locations of M transducers array placed along the pipe centerline 130 denoted as $x_e=(x_e, r_e)$ where $x_e$ and $r_e$ represent respectively the axial and the radial coordinates of the eth location, and e=1, 2, . . . , M. The data are collected as follows. At each of the eth transducer location, an acoustic source signal S(t) is projected, and the system response is measured at all locations within the array at a sampling rate $F_s$ (where as the rule of thumb, the $F_s$ may be selected to be ten times of the maximum injected frequency). Let $P(t, x_i\backslash x_j)$ denote the transient response at time t and location $x_i$ due to a wave source at $x_j$.

Data arrangement. The measured responses $P(n/F_s, x_i\backslash x_j)$ are grouped into a (M×M×N) 3D transfer matrix $K_{3D}$ (see FIG. 5) where i=1, 2, . . . , M, j=1, 2, . . . , M and n=1, 2, . . . , N, and N is the signal length in time. For simplicity, we set $P_{n,i\backslash j}=P(n/F_s, x_i\backslash x_j)$. A MHW in time is applied to $K_{3D}$ to obtain a set of 3D local matrices $\mathbf{K}_{3D}^{\ell}$ where $\ell$=1, 2, . . . , I, and $I=N/t_c$ in which $t_c$, expressed as a number of samples under the sampling rate $F_s$, is the time interval of the MHW (see FIG. 5) [16]. (Details of the MHW can be found in [16].) Each local matrix $\mathbf{K}_{3D}^{\ell}$ is transformed in the frequency domain using the FFT and the result is $\hat{\mathbf{K}}_{3D}^{\ell}$. The proposed pipeline imaging technique is applied on every frequency-transformed local matrix for a given frequency. For example, when using a Gaussian modulated sine pulse acoustic source, the imaging technique will be applied for every $\mathbf{K}^{\ell}(\omega_0)$, where wo is the central frequency of the injected source and at which the frequency response signal peaks. More details about the imaging algorithm steps are given in the following theoretical stage.

A.2. Theoretical Stage: Applying the TR Operation on the Data Collected

Obtaining the signal and noise subspaces. A SVD is applied on $\mathbf{K}^{\ell}(\omega_0)$ as follows:

$$K^{\ell}(\omega_0)=U\sum V^H \tag{1}$$

where the superscript $(\cdot)^H$ denotes a conjugate transpose, U and V are matrices whose columns are the singular vectors $\mu_i$ and $v_i$, while $\Sigma=\text{diag}\{\sigma_1, \sigma_2, \ldots, \sigma_M\}$ is a diagonal matrix with singular values $\sigma_i$, arranged in order of decreasing magnitude. The singular vectors $\mu_i$ and $v_i$ belong to a signal space and a noise subspace, respectively. In practice, it is difficult to separate the signal and noise subspaces due to the complex noise structure and the unknown number of scatterers. The signal and noise components are extracted using an empirical threshold corresponding to 10% of the maximum singular value at the used frequency $\omega_0$ [17] as follows:

$$U=[U_{signal}\mid U_{noise}]=[\mu_1, \mu_2, \ldots, \mu_m \mid \mu_{m+1}, \ldots, \mu_M] \tag{2}$$

and $$V=[V_{signal}\mid V_{noise}]=[v_1, v_2, \ldots, v_m \mid v_{m+1}, \ldots, v], \tag{3}$$

where $U_{signal}$ and $V_{signal}$ are the left and right signal subspaces, $U_{noise}$ and $V_{noise}$ are the left and right noise subspaces, and m is the number of columns of the signal subspaces matrix, which is threshold dependent.

Local imaging functions. A first-order Newmann series solution is considered to obtain the theoretical model for multi-scatterers in a pipe system where weak scattering strength is assumed [18], [19]. Consequently, the theoretical singular vector ($\mu^{Model}$) from the signal subspace associated with an arbitrary scatterer at $x_{sc}=(x_{sc}, r_{sc})$ can be written as:

$$\mu^{Model}(x_e, x_{sc})=[G(x_1\mid x_{sc}), G(x_2\mid x_{sc}), \ldots, G(x_M\mid x_{sc})]^T \tag{4}$$

where G is the Green's function of the pipe system medium defined as [20], [21]

$$G(\omega_0, x_e\mid x)=\frac{i}{2\pi}\sum_{\eta}\frac{J_0(k_{r\eta}r_e)J_0(k_{r\eta}r)}{Rk_{x\eta}\left(1-\frac{\omega_0^2}{R^2k_{r\eta}^2Z^2(\omega_0)}\right)J_0^2(Rk_{r\eta})}\exp(-ik_{x\eta}|x_e-x|). \tag{5}$$

The Green's function $G(\omega_0, x_e\backslash x)$ represents the system impulse response at $x_e$ given a source at x, for a given frequency wo, and comprises the sum of multiple propagating modes $\eta$, each described by the modal axial and radial wavenumbers, $k_{x\eta}$ and $k_{r\eta}$, respectively. Furthermore, $J_0$ is the Bessel function of the first kind of order zero, and $Z(\omega_0)$ is the impedance of the pipe wall 102, which is evaluated using the shell theory model [14], [22].

Given the orthogonality property between the signal and noise subspaces, the scatterers locations ($x_{sc}$) are associated with the locations x at which the inner product between the green function vector $g(x_e\backslash x)$, given by $$g(x_e\mid x)=[G(x_1\mid x), G(x_2\mid x), \ldots, G(x_M\mid x)]^T, \tag{6}$$

and the noise subspace ($\mu_i$(i=1, . . . , M)) is zero, where x=(x, r) scans the whole pipe domain space. Thus, the imaging function $\varphi^{\ell}(x, \omega_0)$ can then be constructed as $$\varphi^{\ell}(x, \omega_0)=\left[\sum_{i=m+1}^{M}|<\mu_i, g(x_e\mid x)>|^2\right]^{-1} \tag{7}$$

where the strength of $\varphi^{\ell}(x, \omega_0)$ at different x provide the pipe local image corresponding to a given local matrix $\hat{\mathbf{K}}^{\ell}(\omega_0)$ (i.e. for each short-segment signal).

Full pipe system image. The full pipe imaging function $\varphi^{\ell}(x, \omega_0)$ is obtained by summing up all local imaging functions $\varphi^{\ell}(x, \omega_0)$ obtained for $\ell$=1, 2, . . . , I. The imaging function is written as $$\varphi(x, \omega_0)=\sum_{\ell}\varphi^{\ell}(x, \omega_0). \tag{8}$$

The strength of $\varphi^{\ell}(x, \omega_0)$ at different x values provides the full pipe image.

B. Examples of Implementation of the Technique

Three examples are given as follows for illustrating experimental and practical implementation of the proposed technique.

B.1. Application on Synthetic Data

An analytical model ([14]) is used to generate synthetic data to test and demonstrate the imaging algorithm. Three test defect cases are considered, namely (i) internal wall thinning; (ii) stiffness reduction in a small region along the wall; and (iii) external wall thinning. In each case, the defect is located 20 m away from the sensors array. In all test cases, the pipe is considered unbounded, 7.86 cm in diameter, 5.7 mm in thickness, and viscoelastic in material (same as HDPE parameters).

The MIMO data is obtained via an array of 10 transceivers placed along the pipe centerline and spaced by 2 cm. The excited wave source signal S(t) is a Gaussian-modulated sine wave with central frequency $f_0$=70 kHz (or $\omega_0=2\pi f_0$) and a narrow frequency [bandwidth FBW being from $0.9f_0$ to $1.1f_0$] [23], [24]. The sampling rate is 1 MHz, and the length of the time signal is set to T=0.02 s. The Hanning window width is taken as T/20. In an experiment, the proposed imaging algorithm was applied to generate pipe images of the three considered test cases. The identified TR image of the defect location, size, and shape, as well as the pipe wall and its thickness, were compared with the actual cases. Accurately predicted TR images were obtained.

B.2. Application in Lab Facility

The proposed technique for pipeline imaging was experimentally tested in the Water Resources Research Laboratory at Hong Kong University of Science and Technology (HKUST). The experimental setup consisted of a straight 6.5 m long, 3-inch diameter HDPE pipe that connected two water-filled tanks at its ends. The nominal external diameter of the pipe was equal to $90\times10^{-3}$ m, and the pipe wall thickness was $5.7\times10^{-3}$ m. To emphasize the imaging capability, the experimental setup included a blockage introduced as a short pipe section located 3.5 m away from the upstream boundary, with a diameter of 33 mm, a thickness $r_B$=7.65 mm, and a length $l_B$=97 mm.

An array of 10 transducer locations was disposed at the pipe centerline and spaced by 2 cm, and located 1.5 m away from the upstream boundary. Considering a linear wave system, only two Brüel & Kjær Type 8104 transducers were used: one as a projector and the other as a sensor. The MIMO data were obtained by successively fixing the projector at a given position in the array and measuring the system response by positioning the sensor successively at all locations within the array. A Gaussian modulated sine wave source S(t) with a central frequency $f_0$=55 kHz and a narrow frequency bandwidth FBW=[$0.9f_0$ to $1.1 f_0$] was used. The sampling rate was 1 MHz, and the length of the measurement time is set to T=0.012 s to prevent the effect of pipe-tank reflection. Prior to data processing, the baseline system response was subtracted to enhance the scattering response signal. The baseline system response is a response of an intact pipe where there is no defect. The used Hanning window width was 1/20 of the length of the measurement time. By applying the proposed imaging algorithm to the experimental set-up, the pipe image was successfully obtained, clearly indicating the blockage location and size as well as the pipe wall 102 and its thickness.

B.3. Application in Field-Scale Facility (Beacon Hill)

The imaging algorithm was further validated in a field-scale facility which represented a more realistic system scale. The facility comprised a 250 m long water-filled viscoelastic 6-inch HDPE pipe (with radius R=0.073 m). A 36.5 m long straight section was selected to perform the imaging test. The section ends connected to two T-access points from which transducers could be introduced. In this case, the transducers were introduced from the downstream end T-access point (T1). Along this section, three T-connections existed (T2, T3, and T4), and a blockage with a thickness $r_B$=0.016 m and a length $l_B$=0.095 m was introduced at 7 m away from the location x=0 m.

By using the proposed imaging algorithm and following the measurement technique conducted in the previously described lab case, the pipe section image was obtained. The image indicated the pipe wall 102 and its thickness, along which three pipe wall openings were shown corresponding to the existing three T-connections. Moreover, the blockage was accurately identified in both location and size.

C. Embodiments of the Present Disclosure

Based on the theoretical development and experimental verification of the proposed technique as disclosed above, embodiments of the present disclosure are developed as follows. Although the present disclosure is particularly useful to the case that the pipeline carries water as in a municipal water-supply system, the present disclosure is also applicable to other types of liquid.

An aspect of the present disclosure is to provide a method for detecting one or more defects on a surface 115 of an interior region 105 of a pipeline 101.

Figure 2:
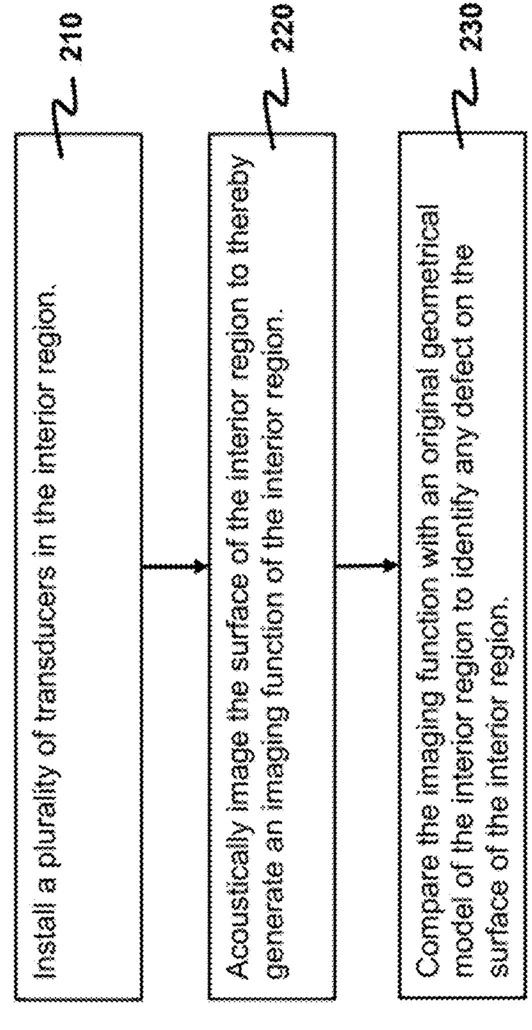
FIG. 2 depicts a workflow showing exemplary steps of a method as disclosed herein for detecting one or more defects on a surface of an interior region of the pipeline.

The disclosed method is exemplarily illustrated as follows with the aid of FIGS. 1 and 2. FIG. 1 depicts a schematic diagram of an exemplary pipe system 100. FIG. 2 depicts a workflow 200 comprising exemplary steps of the disclosed method.

The system 100 comprises a pipeline 101 filled with a liquid, e.g., water. To move the liquid along the pipeline 101, the liquid is pressurized. Nonetheless, it is not necessary to make an assumption of pressurizing the liquid in the pipeline 101 during developing the disclosed method. The pipeline 101 contains one or more defects (e.g., a wall-thinning section 181 and a blockage 182), and has an interior region 105, typically known as a channel for water or liquid transportation. The interior region 105 is bounded by a surface 115. The surface 115 is usually created by a pipe wall 102 of the pipeline 101. As shown by the workflow 200, the disclosed method comprises steps 210, 220 and 230.

In the step 210, a plurality of transducers 120-1:M is installed in the interior region 105. Each of the transducers 120-1:M is capable of converting an electrical signal into an acoustic signal and vice versa. Thereby, each of the transducers 120-1:M is used not only as a transmitter for generating an acoustic signal source but also as a receiver for sensing an acoustic pressure. Usually, each of the transducers 120-1:M is installed on a centerline 130 of the pipeline 101. In a practical implementation of the step 210, the plurality of transducers 120-1:M is realized by a piezoelectric array. Each of the transducers 120-1:M is a piezoelectric transducer.

Figure 3:
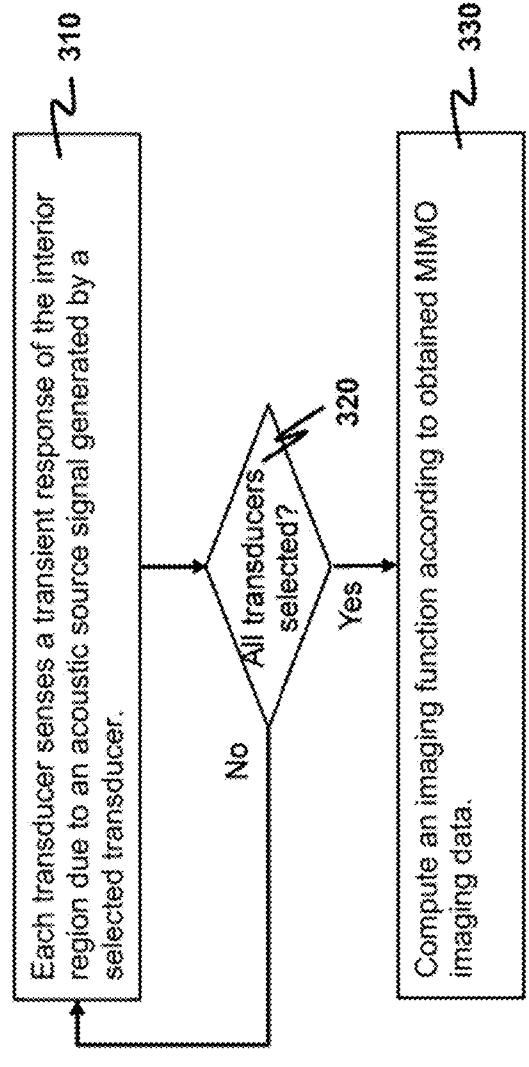
FIG. 3 depicts a flowchart showing exemplary steps used in acoustic imaging of the interior region in the disclosed method.

Acoustic imaging of the surface 115 of the interior region 105 is performed in the step 220 to thereby generate an imaging function of the interior region 105. FIG. 3 depicts a flowchart showing exemplary steps used in the step 220. The step 220 includes steps 310, 320 and 330.

In the step 310, each of the transducers 120-1:M senses a transient response of the interior region 105 due to an excitation caused by an acoustic source signal generated by a transducer selected from the plurality of transducers 120-

1:M. That is, the selected transducer is one of the transducers 120-1:M. Note that the selected transducer that sends out the acoustic source signal is also engaged in sensing the transient response. It is achievable by generating the acoustic source signal having a pulse shape with a narrow pulse width such that the acoustic source signal and the transient response as reflected from the surface 115 do not overlap in time. It is also achievable if the selected transducer is separately installed with an acoustic generator and an acoustic sensor (such as a hydrophone).

Preferably, the acoustic source signal generated by the selected transducer has a carrier frequency in a range of 10 kHz to 100 kHz (i.e. a HF range) for achieving a resolution of imaging the interior region in an order of millimeters.

The acoustic source signal may be a Gaussian modulated sine pulse, etc.

Respective acoustic source signals generated by the plurality of transducers 120-1:M may be the same, may be not entirely the same, may be mutually different, etc. In case not all the respective acoustic source signals are the same, the respective acoustic source signals may be different in signal shape or in average signal power.

Optionally, raw data measured by the selected transducer are pre-processed in the step 310 to generate the sensed transient response for subsequent processing. In certain embodiments of the step 310, raw measurement data acquired from the individual transducer in sensing the transient response are first obtained, and then subtracting a baseline system response from the raw measurement data to yield the sensed transient response of the interior region 105. The baseline system response is a response of an intact pipeline without defect.

It is intended that all the M transducers 120-1:M, which are located at different locations in the interior region 105, are utilized in respectively generating the acoustic source signal to excite the interior region 105. In the step 320, the step 310 is repeated until all the M transducers 120-1:M are selected to excite the interior region 105. After all the M transducers 120-1:M have been used in exciting the interior region 105, respective transient responses generated by the M transducers 120-1:M in M rounds of execution of the step 310 form MIMO imaging data resulted from sensing the interior region 105. Using the MIMO imaging data to estimate a geometrical model of the interior region 105 has an advantage of enhancing a resolution in the estimated geometrical model as M increases. In addition, measured MIMO imaging data contributes to improved image quality, enhances the robustness of imaging systems in challenging and noisy environments, and improves diagnostic accuracy. This makes it a powerful and versatile approach in advanced imaging systems.

After the step 320 is completed, the imaging function of the interior region 105 is computed in the step 330 according to the MIMO imaging data. The imaging function is the estimated geometrical model of the interior region 105 containing information on estimated coordinates of the surface 115.

Figure 4:
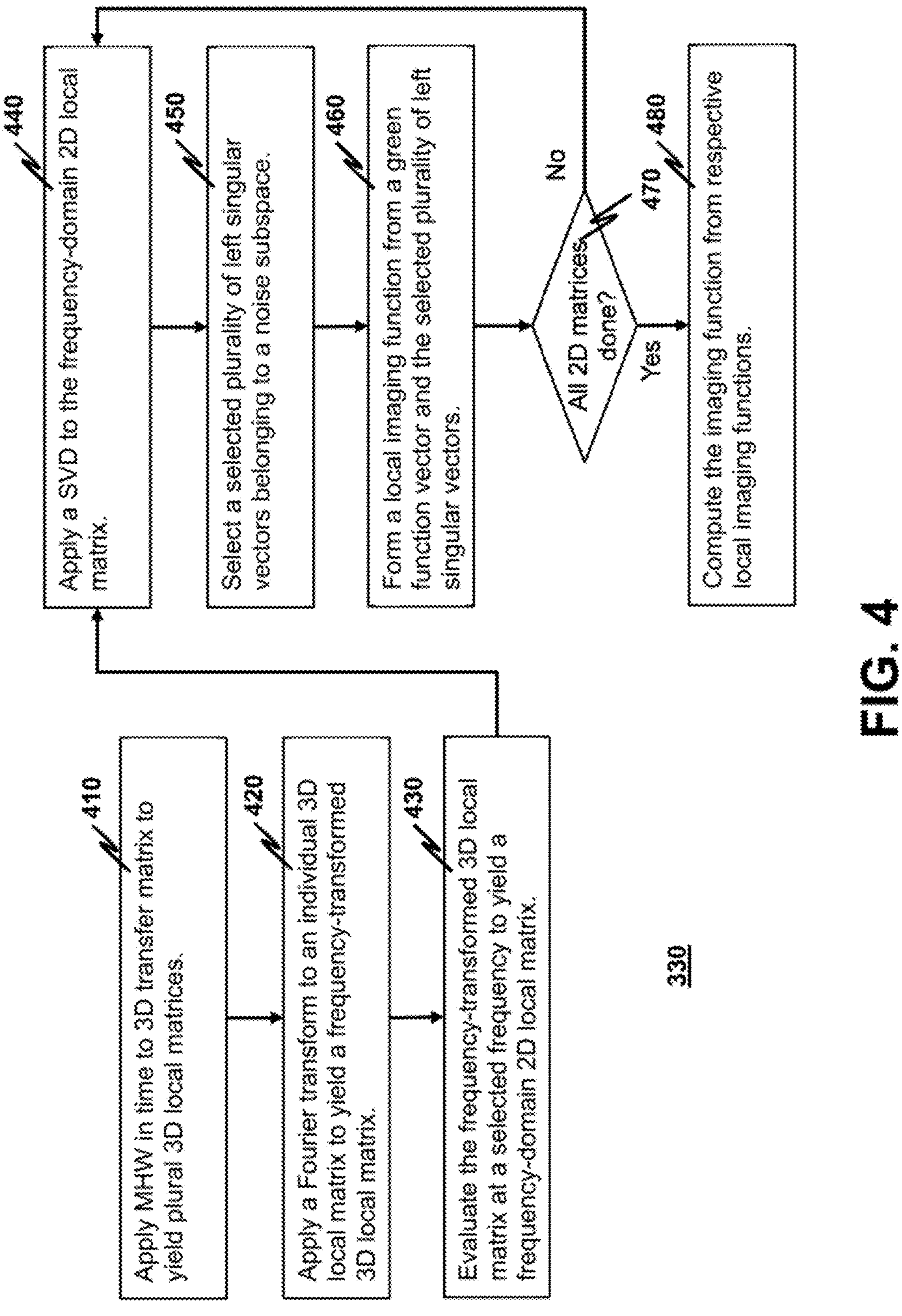
FIG. 4 is a flowchart showing steps used in preferable embodiments of computing an imaging function of the interior region according to MIMO imaging data obtained in acoustic imaging, where the imaging function is an estimated geometrical model of the interior region.
Figure 5:
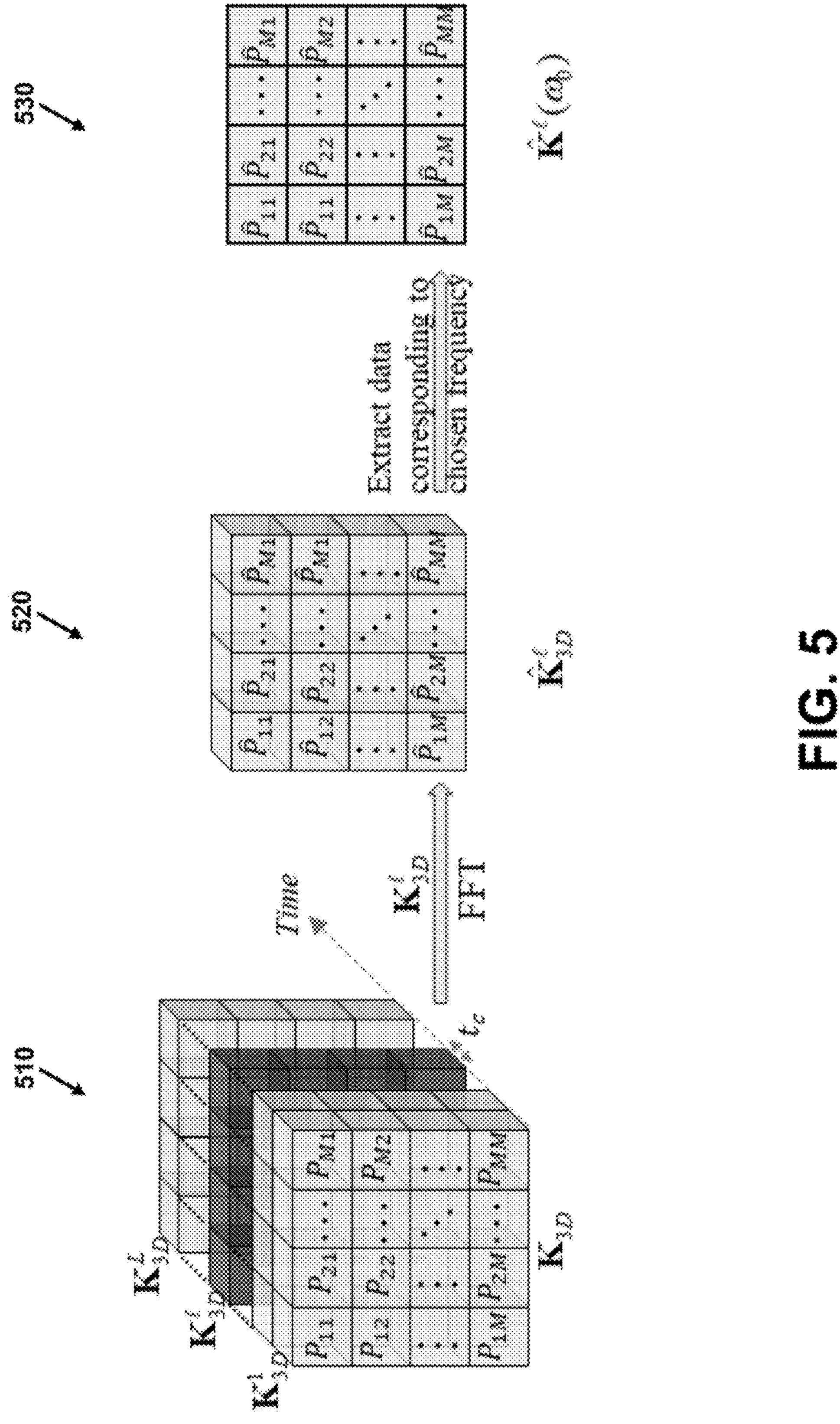
FIG. 5 pictorially illustrates a flow of operations made in processing the MIMO imaging data.

FIG. 4 depicts a flowchart showing steps used in preferable embodiments of the step 320. The step 320 comprises steps 410, 420, 430, 440, 450, 460, 470 and 480. FIG. 5 pictorially illustrates operations made in the steps 410, 420 and 430.

Under the above-mentioned preferable embodiments, the MIMO imaging data obtained in the step 320 are expressed as the 3D transfer matrix, $K_{3D}$, of the interior region 105. The 3D transfer matrix is given by $$K_{3D} = [P_{n,i|j}]_{i=1,\ldots,M;j=1,\ldots,M;n=1,\ldots,N} \tag{9}$$

where $P_{n,i|j}$ is an acoustic pressure sensed by an ith transducer at an nth sampling instant due to the excitation generated by a jth transducer, M is a number of transducers in the plurality of transducers, and N is a number of samples in the transient response.

In the step 410, a MHW is applied in time to $K_{3D}$ to yield a plurality of 3D local matrices denoted as $\{\mathbf{K}_{3D}^{\ell}, \ell=1, 2, \ldots, I\}$ where I is given by $I=N/t_c$ with $t_c$ being a time interval of the MHW. See FIG. 5, illustration 510. The MHW is also known as a sliding Hanning window. The MHW operation segments $K_{3D}$ over time to form a plurality of short-segment 3D matrix having a time duration of $t_c$ such that each short-segment 3D matrix is a local extraction of $K_{3D}$ at a certain time position. Each short-segment 3D matrix is then multiplied with a Hann windowing function to give a corresponding 3D local matrix.

After the plurality of 3D matrices is obtained, a Fourier transform is applied to an individual 3D local matrix in the step 420 to yield a frequency-transformed 3D local matrix. As a result, $\hat{\mathbf{K}}_{3D}^{\ell}$, an $\ell$th frequency-transformed 3D local matrix, is obtained from $\mathbf{K}_{3D}^{\ell}$ for $\ell \in \{1, 2, \ldots, I\}$. See FIG. 5, illustration 520. Preferably and practically, the Fourier transform is a FFT.

In the step 430, the frequency-transformed 3D local matrix is evaluated at a selected frequency determined according to the acoustic source signal to thereby yield a frequency-domain 2D local matrix. See FIG. 5, illustration 530. That is, $\hat{\mathbf{K}}_{3D}^{\ell}$ is evaluated at $\omega_0$, the selected frequency, to yield $\mathbf{K}^{\ell}(\omega_0)$, an $\ell$th frequency-domain 2D local matrix, for $\ell \in \{1, 2, \ldots, I\}$.

A SVD is applied to the frequency-domain 2D local matrix in the step 440 to yield a plurality of left singular vectors, a plurality of right singular vectors and a plurality of singular values, as indicated in EQN. (1) for $\ell=1, 2, \ldots, I$.

In the step 450, a selected plurality of left singular vectors belonging to a noise subspace is selected from the plurality of left singular vectors. The noise space is identified from the plurality of singular values as obtained in the step 440. The selection of the selected plurality of left singular vectors is indicated by EQN. (2).

In the step 460, a local imaging function associated with the frequency-domain 2D local matrix is formed according to a green function vector and the selected plurality of left singular vectors. The green function vector, given by EQN. (6), is a theoretical singular vector from a signal subspace associated with an arbitrary scatterer. The theoretical singular vector is derived according to at least the original geometrical model of the interior region 105. For $\ell \in \{1, 2, \ldots, I\}$, the local imaging function associated with an eth frequency-domain 2D local matrix is denoted as $\varphi^{\ell}(x, \omega_0)$ and is given by EQN. (7).

In the step 470, the steps 440, 450 and 460 are repeated for respective frequency-domain 2D local matrices generated for the plurality of 3D local matrices. As a result, respective local imaging functions are obtained. That is, the $\varphi^{\ell}(x, \omega_0)$, $\ell=1, 2, \ldots, I$, are generated in the step 470.

Finally, the imaging function, $\varphi^{\ell}(x, \omega_0)$, is computed in the step 480 as a sum of the respective local imaging functions according to EQN. (8).

Refer to FIG. 2. In the step 230, the imaging function of the interior region 105 as obtained in the step 220 is compared with an original geometrical model of the interior region 105 to thereby identify the one or more defects 181, 182 on the surface 115 of the interior region 105. The original geometrical model is a geometrical model used as a plan for constructing the pipeline 101.

The present disclosure may be embodied in other specific forms without departing from the spirit or essential characteristics thereof. The present embodiment is therefore to be considered in all respects as illustrative and not restrictive. The scope of the invention is indicated by the appended claims rather than by the foregoing description, and all changes that come within the meaning and range of equivalency of the claims are therefore intended to be embraced therein.

REFERENCES

There follows a list of references that are occasionally cited in the specification. Each of the disclosures of these references is incorporated by reference herein in its entirety.

[1] R. Liemberger and A. Wyatt, "Quantifying the global non-revenue water problem," Water Supply, vol. 19, no. 3, pp. 831-837, 2018.

[2] B. Nestleroth, S. Flamberg, W. Condit, J. Matthews Battelle, L. Wang and A. Chen, "Field Demonstration of Innovative Condition Assesment Technologies for Water Mains: Leak Detection and Location," National Risk Management Research Laboratory—Office of Research and Development—U.S. Environmental Protection Agency, Cincinatti, Ohio, 2012.

[3] "Smartball PWA Inspection Report 16-inch Hanover Park Force Main, prepared by Pure Technologies U.S., Inc., dated November 2015"".

[4] "SmartBall Inspection Report NTW 700 mm Pipeline Prepared for Water Supplies Department (Hong Kong) Prepared by Pure Technologies October, 2018".

[5] X. Wang and M. S. Ghidaoui, ""Pipeline Leak Detection Using the Matched-Field Processing Method,", ASCE, 144(6), (2018)," Journal of Hydraulic Engineering, vol. 144, no. 6, p. 04018030, 2018.

[6] M. Waqar, M. Loauti and M. S. Ghidaoui, "Time-reversal of water hammer waves," Journal of Hydraulic Research, vol. 1, no. 60, pp. 25-45, 2022.

[7] F. Zouari, M. Louati, E. Blåsten and M. S. Ghidaoui, "Multiple defects detection and characterization in pipes," BHR Group 2018 Pressure Surges 13.

[8] P. Kumar and P. K. Mohapatra, "Partial Blockage Detection in Pipelines by Modified Reconstructive Method of Characteristics Technique," J. Hydraul. Eng, vol. 148, no. 4, p. 04022003, 2022.

[9] A. M. Sattar and H. M. Chaudry, "Leak detection in pipelines by frequency response method," Journal of Hydraulic Research, vol. 46, no. sup1, pp. 138-151, 2008.

[10] S. Kim, "Multiple Discrete Blockage Detection Function for Single Pipelines," Proceedings, vol. 2, no. 11, p. 582, 2018.

[11] S. Meniconi, B. Brunone, M. Ferrante, C. Capponi, C. A. Carrettini, C. Chiesa, D. Segalini and E. A. Lanfranchi, "Anomaly pre-localization in distribution-transmission mains by pump trip: preliminary field tests in the Milan pipe system," Journal of hydroinformatics, vol. 17, no. 3, p. 377-389, 2015.

[12] T. C. Che, H. F. Duan and P. J. Lee, "Transient wave-based methods for anomaly detection in fluid pipes," Mechanical Systems and Signal Processing, vol. 160, p. 107874, 2021.

[13] F. Zouari, E. Blåsten, M. Louati and M. S. Ghidaoui, "Internal pipe area reconstruction as a tool for blockage detection," Journal of Hydraulic Engineering, vol. 154, no. 6, p. 04019019, 2019.

[14] S. Nasraoui, M. Louati and M. S. Ghidaoui, "Blockage detection in pressurized water-filled pipe using high frequency acoustic waves," Mechanical Systems and Signal Processing, vol. 185C, no. 109817, 2022.

[15] G. Grigoropoulos, M. S. Ghidaoui, M. Louati and S. Nasraoui, "Time reversal of waves in hydraulics: experimental and theoretical proof with applications," J. Hydraul. Res, vol. 1, p. 60, 2022.

[16] S. Fan, A. Zhang, H. Sun and F. Yun, "A Local TR-MUSIC Algorithm for Damage Imaging of Aircraft Structures," Sensor, vol. 21, no. 10, p. 3334, 2021.

[17] C. Fan, M. Pan, F. Luo and B. W. Drinkwater, "Multi-frequency time-reversal-based imaging for ultrasonic nondestructive evaluation using full matrix capture," IEEE Transactions on Ultrasonics, Ferroelectrics, and Frequency Control, vol. 61, no. 12, pp. 2067-2074, 2014.

[18] J. J. Sakurai, "Modern Quantum Mechanics," Addison, New York, 1994.

[19] Y. Jie, C. L. Anne, G. Bernhard and H. Fazle, "Inverse scattering theory: Inverse scattering series method for one dimensional non-compact support potential," J. Math. Phys, vol. 55, no. 12, p. 123512, 2014.

[20] S. Rienstra and A. Hirschberg, "An introduction to Acoustics," Eindhoven: Self-publishing, 2019.

[21] S. Rienstra and B. Teste, "An analytic Greens' function for a lined circular duct containing uniform mean flow," Journal of Sound and Vibration, vol. 317, no. 5, pp. 994-1016, 2008.

[22] T. C. Lin and G. W. Morgan, "Wave Propagation through Fluid Contained in a Cylindrical, Elastic Shell," The Journal of the Acoustical Society of America, vol. 28, no. 6, pp. 1165-1176, 1956.

[23]M. Louati and M. S. Ghidaoui, "High frequency acoustic wave properties in a water-filled pipe. Part 1: Dispersion and multi-path behaviour," J. Hydraul. Res., vol. 55, no. 5, pp. 613-631, 2017.

[24]Z. Lai, M. Louati, S. Nasraoui and M. S. Ghidaoui, "Numerical Investigation of High Frequency Wave-Leak Interaction in Water-Filled Pipes," J. Hydraul. Eng, vol. 147, no. 1, p. 04020091, 2021.

What is claimed is:

1. A method for detecting one or more defects on a surface of an interior region of a pipeline, the method comprising:

installing a plurality of transducers in the interior region, each of the transducers being capable of converting an electrical signal into an acoustic signal and vice versa;

acoustically imaging the surface of the interior region to thereby generate an imaging function of the interior region, the imaging function being an estimated geometrical model of the interior region; and comparing the imaging function with an original geometrical model of the interior region to thereby identify the one or more defects on the surface of the interior region;

wherein the acoustic imaging of the surface of the interior region comprises:

sensing, by each transducer in the plurality of transducers, a transient response of the interior region due to an excitation caused by an acoustic source signal generated by a transducer selected from the plurality of transducers;

repeating the sensing of the transient response until all transducers in the plurality of transducers are selected to excite the interior region, whereby respective transient responses generated by the plurality of transducers form multi-input multi-output (MIMO) imaging data resulted from sensing the interior region; and computing the imaging function according to the MIMO imaging data;

wherein the MIMO imaging data are expressed as a three-dimensional (3D) transfer matrix of the interior region, wherein the 3D transfer matrix is given by $[P_{n/,i\backslash j}]$i=j, . . . , M,j=1, . . . , N where $P_{n,i\backslash j}$ is an acoustic pressure sensed by an ith transducer at an nth sampling instant due to the excitation generated by a ith transducer, M is a number of transducers in the plurality of transducers, and N is a number of samples in the transient response; and wherein the computing of the imaging function according to the MIMO imaging data comprises the steps of:

(a) applying a moving Hanning window (MHW) in time to the 3D transfer matrix to yield a plurality of 3D local matrices;

(b) applying a Fourier transform to an individual 3D local matrix to yield a frequency-transformed 3D local matrix;

(c) evaluating the frequency-transformed 3D local matrix at a selected frequency determined according to the acoustic source signal to yield a frequency-domain two-dimensional (2D) local matrix;

(d) applying a singular value decomposition (SVD) to the frequency-domain 2D local matrix to yield a plurality of left singular vectors, a plurality of right singular vectors, and a plurality of singular values;

(e) selecting, from the plurality of left singular vectors, a selected plurality of left singular vectors belonging to a noise subspace identified from the plurality of singular values;

(f) forming a local imaging function associated with the frequency-domain 2D local matrix according to a green function vector and the selected plurality of left singular vectors, wherein the green function vector is a theoretical singular vector from a signal subspace associated with an arbitrary scatterer, the theoretical singular vector being derived according to at least the original geometrical model of the interior region;

(g) repeating the steps (d)-(f) for respective frequency-domain 2D local matrices generated for the plurality of 3D local matrices, whereby respective local imaging functions are obtained; and (h) computing the imaging function as a sum of the respective local imaging functions.

2. The method of claim 1, wherein the sensing of the transient response by an individual transducer in the plurality of transducers includes:

obtaining raw measurement data acquired from the individual transducer in sensing the transient response; and subtracting a baseline system response from the raw measurement data to yield the sensed transient response of the interior region, wherein the baseline system response is a response of an intact pipeline without defect.

3. The method of claim 1, wherein:

respective acoustic source signals generated by the plurality of transducers are same; and the acoustic source signal has a carrier frequency in a range of 10 kHz to 100 kHz for achieving a resolution of imaging the interior region in an order of millimeters.

4. The method of claim 1, wherein the Fourier transform is a fast Fourier transform.

5. The method of claim 1, wherein the acoustic source signal is selected to be a Gaussian modulated sine pulse, and the selected frequency is a carrier frequency of the Gaussian modulated sine pulse.

6. The method of claim 1, wherein each transducer in the plurality of transducers installed in the interior region is a piezoelectric transducer.

* * * * *